United States Patent
Guo et al.

(10) Patent No.: US 10,935,871 B2
(45) Date of Patent: Mar. 2, 2021

(54) METHOD FOR SUPPRESSING VIBRATION NOISES OF CAMERA IN ELECTRONIC DEVICE

(71) Applicant: AAC Technologies Pte. Ltd., Singapore (SG)

(72) Inventors: Shun Guo, Shenzhen (CN); Hongxing Wang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 312 days.

(21) Appl. No.: 16/112,934

(22) Filed: Aug. 27, 2018

(65) Prior Publication Data
US 2019/0179210 A1  Jun. 13, 2019

(30) Foreign Application Priority Data
Dec. 12, 2017  (CN) .......................... 201711312458.0

(51) Int. Cl.
 *G03B 5/00* (2021.01)
 *H04R 3/00* (2006.01)
 *H04R 1/02* (2006.01)

(52) U.S. Cl.
 CPC .............. *G03B 5/00* (2013.01); *H04R 3/00* (2013.01); *G03B 2205/00* (2013.01); *G03B 2205/0069* (2013.01); *H04R 1/028* (2013.01); *H04R 2499/11* (2013.01)

(58) Field of Classification Search
None
See application file for complete search history.

(56) References Cited

U.S. PATENT DOCUMENTS

| 2007/0165897 | A1* | 7/2007 | Ishibashi | ................ | H04R 1/083 381/365 |
| 2009/0169197 | A1* | 7/2009 | Fujii | ..................... | G03B 17/00 396/448 |
| 2017/0248838 | A1* | 8/2017 | Kase | .................... | G03B 21/145 |

\* cited by examiner

*Primary Examiner* — Clayton E. LaBalle
*Assistant Examiner* — Dennis Hancock
(74) *Attorney, Agent, or Firm* — IPro, PLLC; Na Xu

(57) ABSTRACT

The present disclosure provides a method for suppressing vibration noises of a camera in an electronic device, wherein the electronic device at least comprises a housing, and an acoustic actuator and a camera accommodated in the housing, and the acoustic actuator drives the electronic device to vibrate and sound; the camera is a zoom lens and comprises a movable component and a fixed component, and the method comprises the following steps of: S1: detecting whether the acoustic actuator is in a vibrating state, performing S2 if the acoustic actuator is in a vibrating state; otherwise, ending the step; S2: generating a drive current according to a relative position relationship between the movable component and the fixed component to drive the movable component to move until abuts against the fixed component and tightly presses the movable component; and S3: repeating S1. The present disclosure greatly suppresses the vibration of the movable component, thereby suppressing the vibration noises of the camera.

9 Claims, 4 Drawing Sheets

METHOD FOR SUPPRESSING VIBRATION NOISES OF CAMERA IN ELECTRONIC DEVICE

CROSS-REFERENCE TO RELATED APPLICATIONS

This application claims the priority benefit of Chinese Patent Application Ser. No. 201711312458.0 filed on Dec. 12, 2017, the entire content of which is incorporated herein by reference.

FIELD OF THE PRESENT DISCLOSURE

The disclosure relates to a method for suppressing noises in the field of electronic devices, and more particularly, to a method for suppressing vibration noises of a camera in an electronic device.

DESCRIPTION OF RELATED ART

The advancement of science and technology has led to the rapid development of electronic products, and the related technologies of various electronic products and related electronic product components have been continuously improved and innovated, among which a sounding technology is a commonly used one.

The related technology provides a more advanced sounding technology without arranging a sounding hole in a housing, in which sounds are made the vibration of a shell or a partial housing of an electronic product such as a mobile phone, a tablet computer, etc., wherein the shell can be made of metal, glass, plastic, ceramic and other materials, compared with a traditional loud speaker, the advanced sounding technology makes the electronic device thinner and lighter, without arranging a sounding hole in the housing of the device, which improves the aesthetic degree and water resistance of the device.

However, in the electronic products, the vibration of the entire or partial housing of the product will drive a certain degree of vibration of each component in the product. Product such as a mobile phone is usually provided with a camera internally, and in the camera capable of automatic-focusing or anti-shaking, a movable component is internally provided, such as a movable lens component, that can be driven by an actuating coil to realize the automatic-focusing or anti-shaking function. Due to the existence of the movable component, when a camera module is driven by an external force and especially driven by en external force with a wider frequency band, the movable component will vibrate, and then collision noises are generated, which greatly destroys the hearing sense.

Therefore, it is necessary to provide a method for suppressing the vibration noises of the camera.

BRIEF DESCRIPTION OF THE DRAWINGS

In order to illustrate the technical solutions in the embodiments of the disclosure more clearly, the drawings used in the description of the embodiments will be briefly described hereinafter. Obviously, the drawings in the following description are merely some embodiments of the disclosure, and those skilled in the art can also obtain other drawings according to these drawings without going through any creative work, wherein.

DETAILED DESCRIPTION OF THE EXEMPLARY EMBODIMENTS

The technical solutions in the embodiments of the disclosure will be clearly and completely described hereinafter with reference to the drawings in the embodiments of the disclosure, and obviously, the described embodiments are merely part but not all of the embodiments of the disclosure. Based on the embodiments in the disclosure, all other embodiments obtained by those skilled in the art without going through any creative work will fall within the protection scope of the disclosure.

Figure 1:
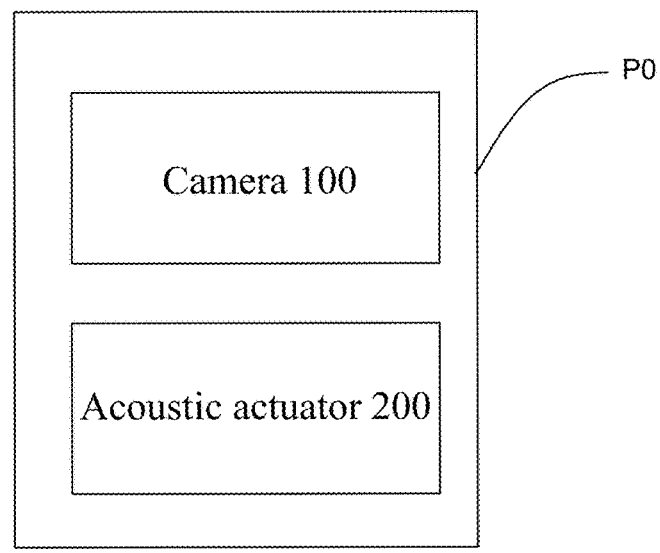
FIG. 1 is a structure diagram of an electronic device P0 according to the present disclosure.

FIG. 1 is a structure diagram of an electronic device P0 disclosed by a first embodiment of the present disclosure. The electronic device P0 comprises a housing having an accommodating space, an acoustic actuator 200 for vibrating and sounding and a camera 100 accommodated in the housing. The acoustic actuator 200 vibrates to make the electronic device P0 sound, and is arranged to relatively fix with the housing. The camera 100 is arranged in the electronic device P0 to realize zooming and anti-shaking functions.

In the embodiment, the electronic device P0 may be a mobile phone, a tablet computer, or the like. The vibrating and sounding of the electronic device P0 are caused by the acoustic actuator 200 or the like. The acoustic actuator 200 for vibrating and sounding is an actuator based on a piezo-ceramic material, a solenoid drive technology, a magnetostrictive effect, or the like. An integration mode of the acoustic actuator 200 for vibrating and sounding in the electronic device P0 is not limited, which may be bound by an adhesive tape, and may also be fixed by a screw, etc.

Figure 2:
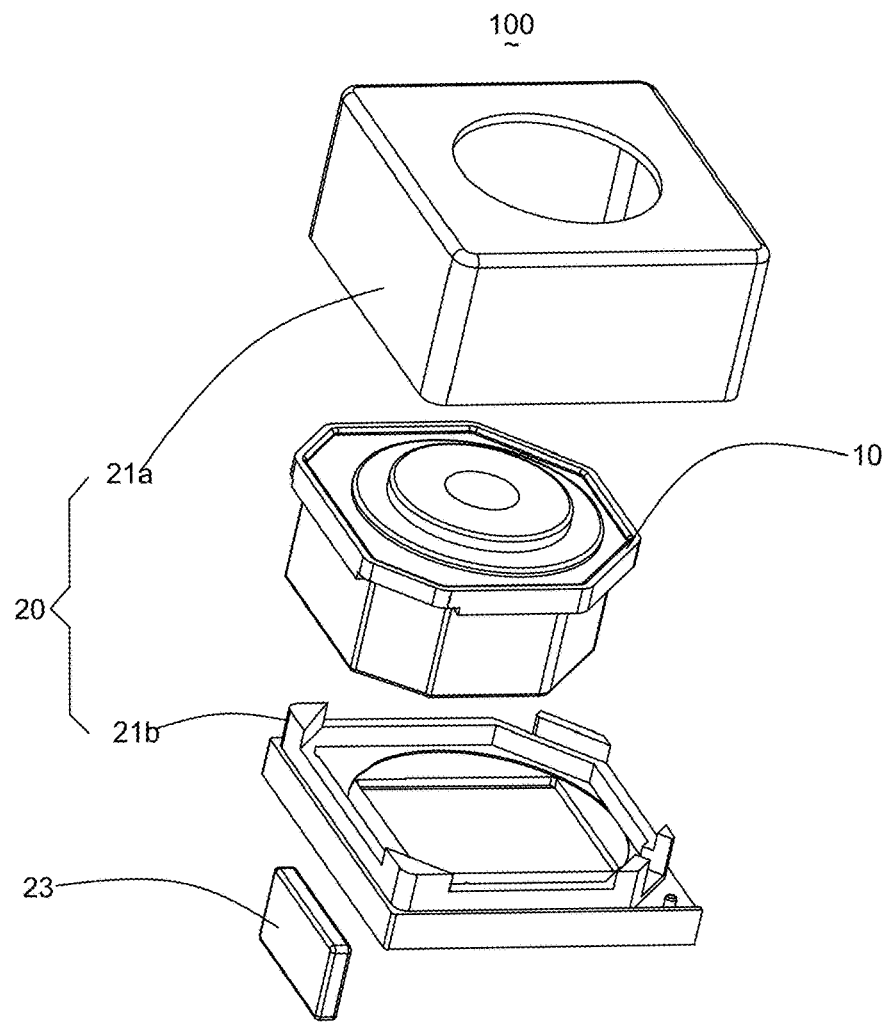
FIG. 2 is a structure diagram of a first embodiment of a camera in the electronic device as shown in FIG. 1.
Figure 3:
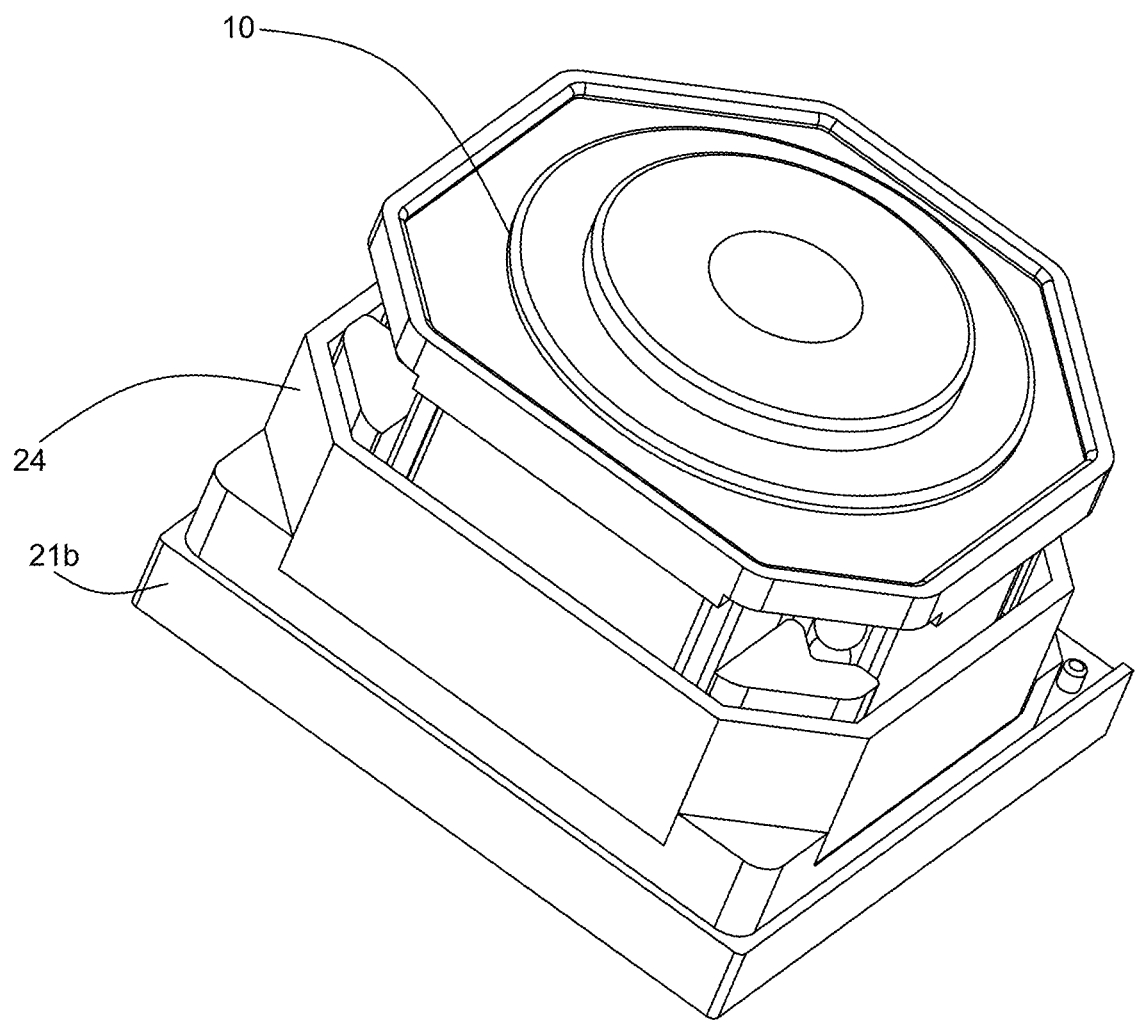
FIG. 3 is a structure diagram of a second embodiment of the camera in the electronic device as shown in FIG. 1.

As shown in FIG. 2, the camera 100 is a zoom lens and comprises a movable component 10 and a fixed component 20. The movable component 10 is arranged to the fixed component 20, and the movable component 10 can move relative to the fixed component 20. The fixed component 20 is an inner shell having an accommodating space, and the camera 100 further comprises an actuating coil 23 fixed in the inner shell. The inner shell comprises an upper housing 21a and a lower housing 21b that can be assembled with the upper housing 21a to form the accommodating space, and the movable component 10 is accommodated in the accommodating space. The actuating coil 23 is fixed in the inner shell. A relative position relationship between the movable component 10 and the fixed component 20 is determined by a distance between the initial position of the movable component 10 and an inner wall of the inner shell. In the embodiment, the actuating coil 23 is platelike. As shown in FIG. 3, in another preferred embodiment of the present disclosure, an annular actuator coil 24 is sleeved on an outer periphery of the movable component 10 to drive the movable component to move.

The movable component 10 may be the movable component in the camera 100 such as a movable lens component with auto-focusing or anti-shaking function. The initial position of the movable component 10 is located at a middle position of the inner shell, such as a geometric center position of an accommodating cavity of the inner shell, and is arranged with the inner shell by spacing.

Figure 4:
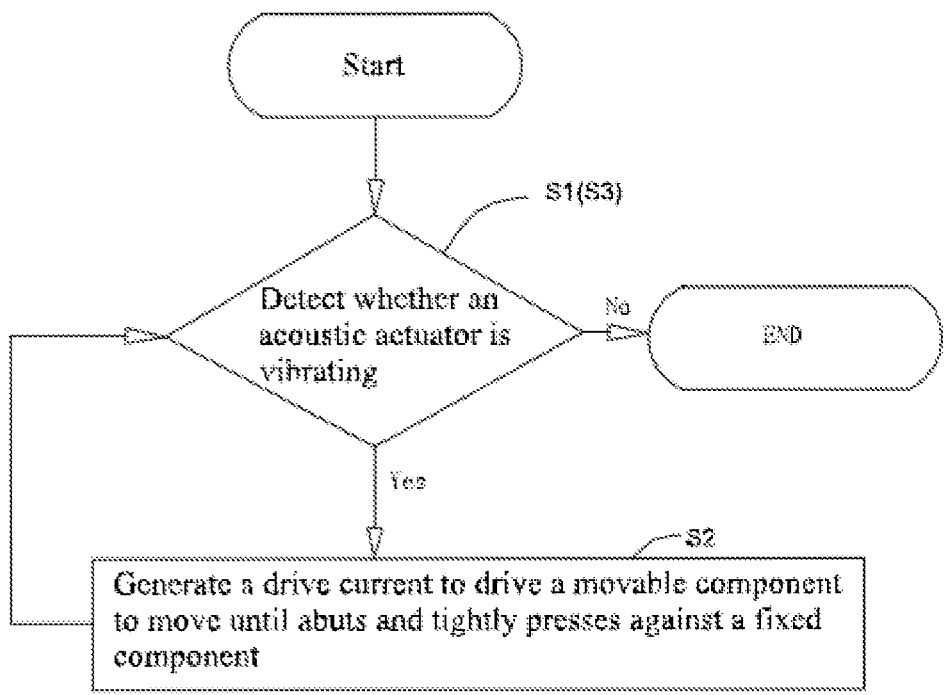
FIG. 4 is a flow chart of a method for suppressing vibration noises of the camera in the electronic device as shown in FIG. 1.
Figure 5:
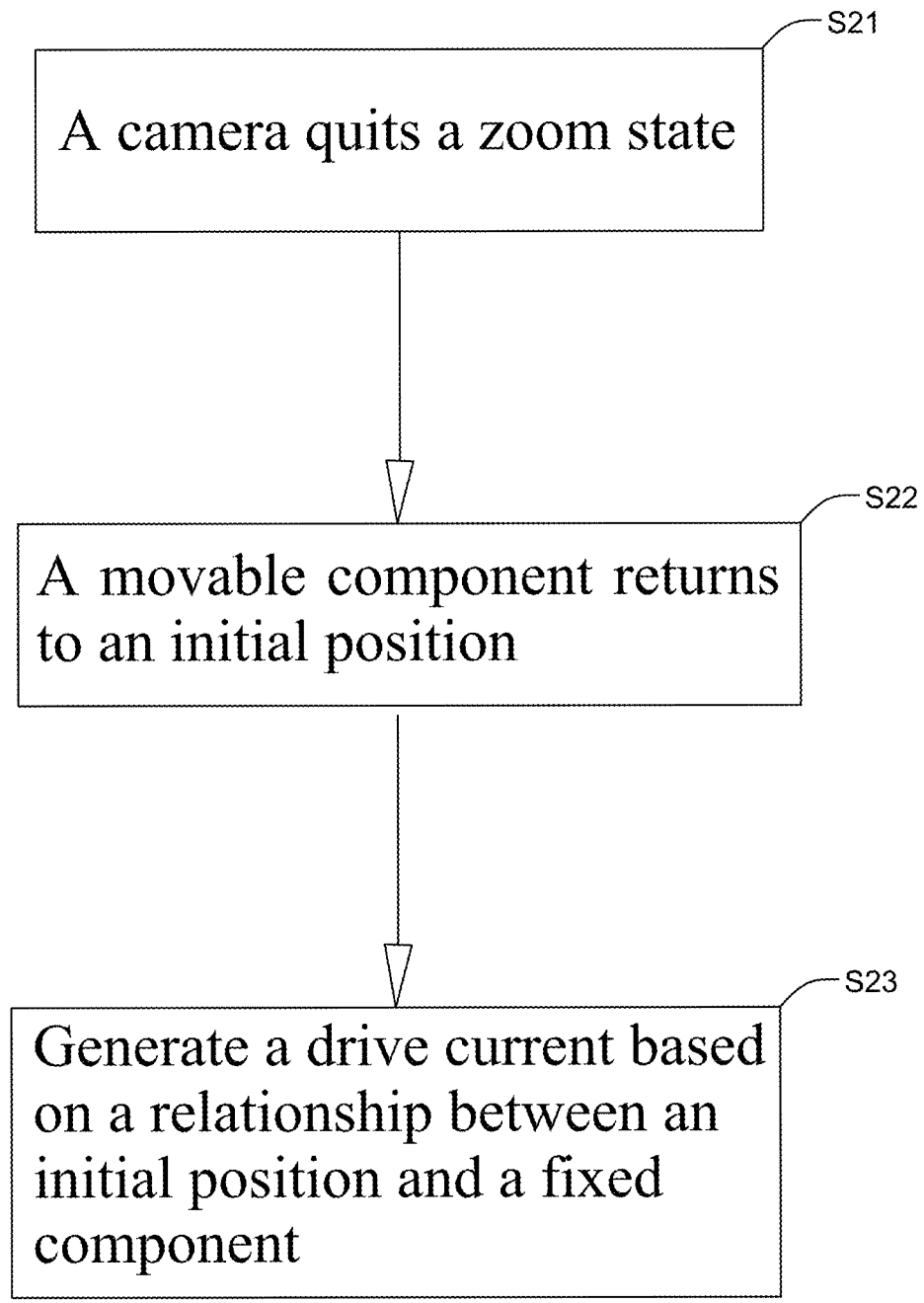
FIG. 5 is a further flow chart of the method that has been shown in the flow chart of FIG. 1.

When the electronic device P0 is vibrating, the movable component 10 of the camera 100 can move relative to the fixed component 20 to generate noises. In order to suppress the noises generated by the vibration of the movable component 10 of the camera 100 in the electronic device P0, the method as shown in FIG. 4 is adopted, which comprises the following steps of:

S1: detecting whether the acoustic actuator 200 is in a vibrating state, performing S2 if the acoustic actuator is in a vibrating state; otherwise, ending the step;

S2: generating a drive current according to a relative position relationship between the movable component 10 and the fixed component 20 to drive the movable component 10 to move to the inner wall of the inner shell of the fixed component 20 until abuts against and tightly presses; and S3: repeating S1.

In the embodiment, the initial position of the movable component 10 can be relatively arranged with the fixed component 20 by spacing, and the initial position of the movable component 10 is for example located at the geometric center position of the accommodating cavity of the inner shell.

Specifically, in S2, if the camera is in a zoom state, the method further comprises the following steps.

In S21, the camera 100 quits the zoom state;

in S22, the movable component 10 returns to an initial position; and in S23, the distance between the initial position of the movable component 10 and the inner wall of the inner shell is determined, i.e., the relative position relationship between the movable component 10 and the fixed component 20; and Amount of a current and time needed to move the movable component 10 to the inner wall of the inner shell is judged, and a drive current is generated.

For example, the drive current value needed is set as a, the time needed is set as t1, and the current signal is defined as a first current signal I1.

The first current signal I1 is provided to the actuating coil 23/24 to make the actuating coil 23/24 generate an acting force to move the movable component 10 to the inner wall of the inner shell of the fixed component 20, and make the movable component 10 abut against the fixed component 20.

The first current signal I1 is used as a suppression signal for suppressing the movement of the movable component 10 affected by the acoustic actuator 200 at the same time.

In S24, the amount of the current and the time needed to tightly press the movable component 10 to the inner wall of the inner shell is judged, the drive current value needed is set as b, the time needed is set as t2, and the current signal is defined as a second current signal I2.

The second current signal I2 is provided to the actuating coil 23/24 to drive the actuating coil 23/24 to generate an acting force to balance out a suppression signal generated by the vibration of the movable component 10.

Therefore, the first current signal I1 is used to prompt the movement of the movable component in case of suppressing the vibration, and the second current signal I2 is used to suppress the vibration of the movable component when the movable component 10 is in close contact with the fixed component 20. Therefore, the second current signal I2 is smaller than the first current signal I1 in a preferred case.

When detecting that the electronic device P0 is vibrating, the amount of suppression signal needed for suppressing the noises caused by the vibration of the electronic device P0 is judged, which is set as b; correspondingly, the actuating coil 23/24 of the camera 100 correspondingly generates a second suppression signal to make the movable component 10 tightly press the fixed component 20, and the second suppression signal is a second current signal with a current value of b. That is, the actuating coil 23/24 of the camera 100 firstly generates a first current signal with a current value of a to drive the movable component 10 to move and abut against the fixed component 20, after a duration of t1, the actuating coil 23/24 of the camera 100 correspondingly generates a driving signal with a current value of b to drive the movable component 10 to tightly press the fixed component 20 for a duration of t2, so as to avoid noises generated by moving the movable component 10 relative to the fixed component 20.

In the embodiment, the initial position of the movable component 10 may either be arranged with the inner shell by spacing or directly adjacent to the inner shell, when the electronic device P0 is in a vibrating state, the first current signal is generated to the actuating coil 23/24 of the camera 100, so that the movable component 10 abuts against the inner shell. According to the amount of the force of the acoustic actuator 200 generating vibration, the second current signal is further provided to the actuating coil 23/24 correspondingly to meet the requirement of suppressing the noises caused by vibrating and sounding, so as to ensure that the movable component 10 is difficult to vibrate and sound when the electronic device P0 is vibrating and sounding.

Specifically, the inner shell comprises an upper housing 21a and a lower housing 21b, and at the initial position, the distance between the movable component 10 and the upper housing 21a and the distance between the movable component 10 and the lower housing 21b may be unequal.

In order to suppress the noises generated by the vibration of the movable component 10 of the camera 100 in the electronic device, a method of the below embodiment is adopted, which comprises the following steps of:

S1: detecting whether the acoustic actuator 200 is in a vibrating state, performing S2 if the acoustic actuator is in a vibrating state; otherwise, ending the step;

S2: generating a drive current according to a relative position relationship between the movable component 10 and the closest fixed component 20 to drive the movable component 10 to move to the inner wall of the closest fixed component 20 (for example, the upper housing 21a), and abut against and tightly press; and S3: repeating S1.

In the embodiment, the initial position of the movable component 10 is relatively arranged with the upper housing 21a and the lower housing 21b by spacing, and the distance between the upper housing 21a and the movable component 10 is closest compared to the distance between the movable component 10 and other fixed components. After determining the relative position between the movable component 10 and the closest upper casing 21a, the amount of the current and time needed for moving the movable component 10 to the upper housing 21a are judged, the drive current value needed is set as a, and the time needed is set as t1.

The actuating coil 23/24 of the camera 100 correspondingly generates the first suppression signal to drive the movable component 10 to move to abut against the upper housing 21a.

In the step, the actuating coil 23/24 of the camera 100 generates a current with a current value of a to drive the actuating coil to generate an acting force to drive the movable component 10 to move to the upper housing 21a, and make the movable component 10 abut against the upper housing 21a.

In the embodiment, the fixed component 20 closest to the movable component is firstly determined, and then the first suppression signal is generated to drive the movable component 10 to move to the fixed component 20, so that the current value of the first suppression signal is minimum; compared with the first embodiment, a smaller drive current is needed, which saves electric power and improves efficiency.

In another preferred embodiment of the present disclosure, the initial position of the movable component 10 directly abuts against the inner shell of the fixed component 20, that is, in an initial working state, the spacing between the movable component 10 and the fixed component 20 is zero.

In view that the initial position of the movable component 10 directly abuts against the fixed component 20, then the actuating coil 23/24 of the camera 100 does not need to be applied the driving signal to drive the movable component 10 to move to the fixed component 20 in the initial state; when the vibrating and sounding of the electronic device are detected, the amount of suppression signal needed for suppressing the noises caused by the vibration of the electronic device is judged, and is set as the current value b; correspondingly, the actuating coil 23/24 of the camera 100 correspondingly drives the movable component 10 to tightly press the fixed component 20. That is, a current with a current value of b is directly generated to the actuating coil 23/24 of the camera 100 to drive the movable component 10 to tightly press the fixed component 20, so as to avoid the movable component 10 moving to generate noises.

In all the embodiments above, the relative position of the movable component 10 to the fixed component 20 is judged firstly, and the judgment results comprise that: the initial position of the movable component abuts against the fixed component; or the movable component is arranged with the fixed component by spacing.

Secondly, whether the electronic device is in a vibrating and sounding state is detected, and the detection results comprise that:

when the electronic device does not vibrate, the actuating coil of the camera keeps a normal working state;

when the electronic device vibrates, the actuating coil of the camera correspondingly generates a suppression signal to drive the movable component to tightly press the fixed component, so as to keep the relative stillness of the movable component and the fixed component, thereby avoiding the noises generated by collision between the movable component and the fixed component.

Compared with the related arts, the present disclosure has the beneficial effects that: when the electronic device is in a vibrating state, the initial position of the movable component in the camera is judged, a corresponding suppression signal is generated by calculating a corresponding displacement, and the suppression signal is received by the actuating coil to realize corresponding driving. The position of the movable component in the camera is stabilized by the driving mode of the suppression signal, which does not cause collision between the movable component and other fixed components in the camera, so that collision noises are not generated and the hearing sense is not affected.

The vibration of the electronic device in the embodiment is controlled by the acoustic actuator, i.e., the vibration of the acoustic actuator causes the vibration of the electronic device itself or the housing thereof, so as to form and make sounds, while a trigger signal for controlling the acoustic actuator to start or stop vibrating may be provided by a touch controller or a CPU.

Further, the number of the actuating coils in the camera of the present disclosure may be one or more; The first current signal and the second current signal generating the suppression signal may be given to one or more actuating coils.

Further, the position sensor can adopt one or a plurality of Hall sensors.

The contents above are merely embodiments of the disclosure, and it shall be herein pointed out that those skilled in the art can make improvements without departing from the concept of the disclosure, and all these improvements shall fall within the protection scope of the disclosure.

What is claimed is:

1. A method for suppressing vibration noises of a camera in an electronic device, wherein the electronic device at least comprises a housing, and an acoustic actuator and a camera accommodated in the housing, and the acoustic actuator drives the electronic device to vibrate and sound; and the camera is a zoom lens and comprises a movable component and a fixed component, characterized in that the method comprises the following steps of:
    S1: detecting whether the acoustic actuator is in a vibrating state, performing S2 if the acoustic actuator is in a vibrating state; otherwise, ending the step;
    S2: generating a drive current according to a relative position relationship between the movable component and the fixed component to drive the movable component to move until abuts against the fixed component and tightly presses the fixed component; and
    S3: repeating S1.

2. The method for suppressing vibration noises of a camera in an electronic device according to claim 1, characterized in that in S2, the camera quits a zoom state, the movable component automatically returns to an initial position, and the relative position relationship is determined by a distance between the initial position and the fixed component.

3. The method for suppressing vibration noises of a camera in an electronic device according to claim 2, characterized in that the fixed component comprises an inner shell having an accommodating space, the movable component is accommodated in the accommodating space, and the relative position relationship is determined by the initial position and an inner wall of the inner shell closest to the initial position.

4. The method for suppressing vibration noises of a camera in an electronic device according to claim 3, characterized in that the initial position is located at a geometric center position of the accommodating space.

5. The method for suppressing vibration noises of a camera in an electronic device according to claim 3, characterized in that the initial position is close to the inner wall of the inner shell.

6. The method for suppressing vibration noises of a camera in an electronic device according to claim 3, characterized in that the acoustic actuator is a piezoelectric actuator or an electromagnetic actuator, and the acoustic actuator and the housing are relatively fixed.

7. The method for suppressing vibration noises of a camera in an electronic device according to claim 3, characterized in that the camera further comprises an actuating coil fixed in the inner shell, and the drive current flows through the actuating coil to drive the movable component to move in the accommodating space.

8. The method for suppressing vibration noises of a camera in an electronic device according to claim 1, characterized in that the drive current comprises a first current signal and a second current signal, the first current signal drives the movable component to move to the fixed component, and the second current signal drives the movable component to keep tightly pressing the fixed component.

9. The method for suppressing vibration noises of a camera in an electronic device according to claim 8, characterized in that the second current signal is less than or equal to the first current signal.

\* \* \* \* \*